United States Patent
Goldstein

[19]

[11] Patent Number: 5,954,452
[45] Date of Patent: Sep. 21, 1999

[54] IN SITU REMEDIATION OF UNDERGROUND ORGANIC POLLUTION

[75] Inventor: Michel Goldstein, Randolph, N.J.

[73] Assignee: GA Technologies, Inc., Parsippany, N.J.

[21] Appl. No.: 08/893,748

[22] Filed: Jul. 11, 1997

[51] Int. Cl.$^6$ .............................. B09C 1/06; B09C 1/08; E21B 36/00
[52] U.S. Cl. ............................ 405/128; 166/53; 166/57; 166/250.01; 166/303; 210/759; 405/131
[58] Field of Search .................................. 166/52, 53, 64, 166/66, 250.1, 303; 210/170, 747, 759, 761; 405/128, 131

[56] References Cited

U.S. PATENT DOCUMENTS

| | | | |
|---|---|---|---|
| 4,540,052 | 9/1985 | Hitzman | 166/303 |
| 5,205,648 | 4/1993 | Fissenko | 366/177 |
| 5,275,486 | 1/1994 | Fissenko | 377/177 |
| 5,286,141 | 2/1994 | Vigneri | 405/128 |
| 5,509,760 | 4/1996 | Schreifer | 405/258 |
| 5,525,008 | 6/1996 | Wilson | 405/128 |
| 5,611,642 | 3/1997 | Wilson | 405/128 |
| 5,615,974 | 4/1997 | Land et al. | 405/128 |
| 5,628,364 | 5/1997 | Trenz | 166/53 |
| 5,639,380 | 6/1997 | Misquitta | 166/53 X |
| 5,656,239 | 8/1997 | Stegemeier et al. | 422/32 |

OTHER PUBLICATIONS

Hydrogen Peroxide Technical Bulletin FMC Corp. (undated).
"The Fisonic Energy Device—Principles of Operation"—Yladimir V. Fisenko—Paper–Joint Power Conf. Oct. 11, 1995.
"Instant Pressurized Hot Water Supply"—Brochure of Fisonic Corp. (undated).
"District/Area Heating System Model DHS–100", Brochure of Fisonic Corp. (undated).
"Instant Pressurized Hot Water Supply Model HW–88", Brochure of Fisonic Corp. (undated).
"FeedWater Heater Model FWH–100", Brochure of Fisonic Corp. (undated).

*Primary Examiner*—George Suchfield

[57] ABSTRACT

Heated hydrogen peroxide reagent under pressure is supplied to a well for underground remediation of pollution; the reaction with the pollutant is exothermic so that the high temperature of the reagent when injected is maintained as the reagent spreads. The remediation reaction is monitored by sensors, to regulate the supply of reagent and to shut off the supply automatically when the pollutant has been reduced to an acceptable level.

12 Claims, 2 Drawing Sheets

IN SITU REMEDIATION OF UNDERGROUND ORGANIC POLLUTION

This invention relates to methods and apparatus for in situ remediation of underground pollution.

BACKGROUND OF THE INVENTION

Leakage of gasoline or fuel oil from storage tanks is a common cause of underground pollution. A leak or spill of such pollutants may spread underground as a plume. Whether as a leak or as the result of prolonged conditions in an industrial complex, pollutants may travel to great depths; the pollution may extend into various underground formations, and it may enter the aquifer; and the pollution may penetrate under the foundations of buildings. Removal and exposure of contaminated soil for treatment is often impractical, so that in situ remediation becomes necessary.

In addition to gasoline and fuel oil, other examples of pollutants that are frequently found in soil and ground water include motor oil, polychlorinated biphenyl (PCB), chlorinated ethylene solvent, benzene, toluene, ethyl benzene and xylene. These four latter substances are referred to by the acronym BTEX. The BTEX measurement is used as a quantitative determination of the contamination.

In situ remediation of underground hydrocarbon contamination makes use of chemistry of Fenton, which dates back to 1898. Hydrogen peroxide is used to oxidize organic pollutants, breaking down complex organic compounds into successively smaller-chain compounds, ultimately becoming non-hazardous carbon dioxide and water. A metallic salt is introduced as a catalyst, for separating the hydrogen peroxide into HO radicals; it is those radicals which react with the organic compounds.

For in situ treatment of underground pollution, hydrogen peroxide is introduced into the subsoil via wells; its distribution from the wells commonly depends on natural permeability and capillarity of the underground strata. Such distribution is inherently slow, so that the treatment may take many weeks or months.

Compressed air is recommended in U.S. Pat. No. 5,525,008 (Wilson, issued Jun. 11, 1996) for injecting and promoting more rapid spread of hydrogen peroxide and catalysts into the treatment site.

SUMMARY OF THE INVENTION

A remediation agent is introduced by an injection well at an "injection site"; the reagent is introduced under high pressure into the stratum to be treated. The high pressure forces the reagent to travel from the injection site into a spreading treatment pattern. The reagent, commonly water and hydrogen peroxide, is ordinarily liquid, although it might include steam. The pressure that is applied to the reagent in the well at the surface level is augmented by the hydraulic head developed by the column of reagent in the well above the injection site.

In one embodiment of the invention, a solution of water and hydrogen peroxide is combined above-ground with steam under pressure. The steam tends to condense as the reagent enters the injection well, but the steam pressure nevertheless forces the hot condensate to spread underground. The elevated temperature of the reagent at the injection site renders the hydrogen peroxide much more active chemically than it would be at ambient temperature. The reaction with the hydrocarbon pollutant is accelerated by that high temperature. There is no need for a catalyst.

The reaction is exothermic. With an appropriate concentration of the reagent, the high temperature of the reagent at the injection site is sustained as the reagent spreads in the polluted stratum. Due, in part, to the exothermic characteristic of the reaction and due to the rapid spread of the reagent under pressure, the elevated temperature of the reagent is propagated as the reagent encounters and reacts with pollutants.

In another aspect of the present invention, hydrogen peroxide in water and steam are combined to yield a single-phase flow of heated reagent that is delivered into an injection well at enormous pressure utilizing phenomena described in U.S. Pat. Nos. 5,205,648 and 5,275,486 issued to Vlademir V. Fissenko. Those patents are incorporated here in their entireties, by reference.

Here, a commercial solution of high-concentration hydrogen peroxide in water at ambient temperature is introduced through one port of the Fissenko apparatus; additional water may be introduced separately or as a diluent. Steam at high temperature and high pressure is introduced through another port. These flows are combined so as to yield a homogenized two-phase flow. Due to the relationships detailed in the Fissenko patents, the combined flow is accelerated, e.g., to mach 10 or even mach 30. It is arranged to develop a sustained sonic shock wave, resulting in a single-phase output whose pressure is proportional to the square of the mach number of the combined flow of steam and hydrogen peroxide solution. This output, at high temperature and high pressure, is forced into an injection well. The discharge of reagent from the injection well into the injection site spreads rapidly in the stratum to be treated due to its remarkably high pressure; the reagent is highly reactive with organic pollutants due to its high temperature, which may be 90° C. or higher.

As already noted, the reaction of hydrogen peroxide with the pollutant is exothermic. Consequently, as the flow of hot reagent spreads and reacts exothermically with pollutant, the high temperature of the reagent is propagated as it spreads.

Reagent-injection wells are distributed in a pattern designed by test exploration to treat the entire plume of pollution. A cluster of sensing probes is provided for each injection well. When the reagent spreads from the injection site of an injection well to the test probes, the reaction causes the temperature at one or more of the probes to rise; additionally, the pressure at one or more of the probes rises due in part to the pressure of the reagent and due to gaseous reaction products that develop in the reaction.

There is a feedback provision from each of the probes in a pattern related to each injection well. If, unexpectedly, an excessive sensed temperature rise or pressure rise should develop at any probe, the rate of supply or the concentration of hydrogen peroxide to the related injection well is adjusted automatically by the output from the sensing probes, thereby to guard against development of explosive conditions. Moreover, the same sensors are used with appropriate computer processors to recognize the onset and continuation of the remediation reaction. When such reaction declines to low levels signifying completion of the remediation at all of the sensers related to an injection well, then the supply of reagent to that injection well is terminated. This regulation provides economy in the remediation treatment of a polluted area. The saving of reagent can be particularly significant where many injection wells are in operation. The feedback control is automatic, avoiding the burden of frequent and numerous test observations by supervisory personnel.

The invention in its varied aspects will be better appreciated from the following detailed discussion of illustrative apparatus and methods of remediation.

BRIEF DESCRIPTION OF THE ACCOMPANYING DRAWINGS

DETAILED DESCRIPTION OF ILLUSTRATIVE EMBODIMENTS OF THE INVENTION

Figure 1:
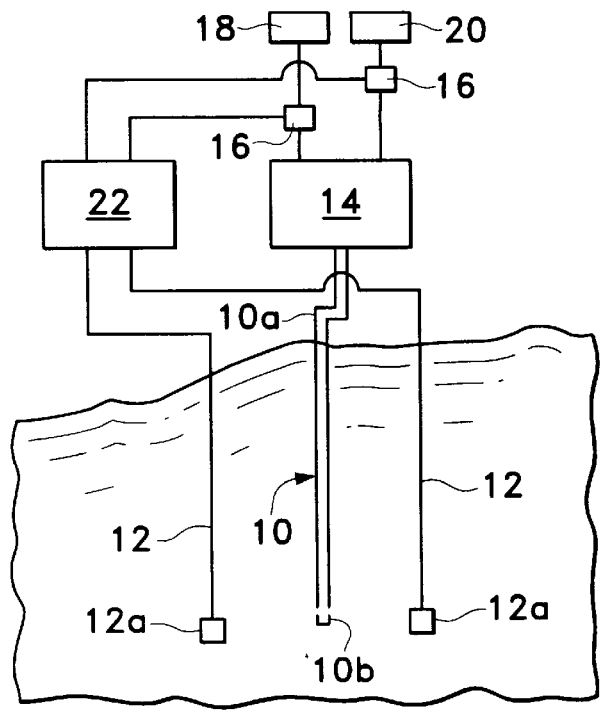
FIG. 1 is a diagram representing one embodiment of certain aspects of the invention.

FIG. 1 represents, diagrammatically, an embodiment of several aspects of the invention. An injection well 10 extends from an above-ground end 10a to an opening at its lower end 10b. This is the injection site, at a stratum known by preparatory tests to need remediation treatment. Reagent is supplied to the well as steam under pressure from boiler 14. Due to condensation, the well is partly or entirely filled with liquid; it is injected into the soil at a high temperature approaching the value corresponding to the steam pressure. The pressure of the reagent at the injection site is the sum of the steam pressure plus the hydraulic head of the condensate in the well.

In a practical example, the injection well will comprise an inner pipe capable of withstanding the maximum anticipated pressure of the reagent, plus an outer coaxial pipe separated by thermal insulation from the inner pipe. The outer pipe may be of plastic so as to contribute to the thermal insulation, supplemented by air or other heat insulation in the space separating the inner and outer pipes. Basically, the injection well may comprise a single pipe providing the required wall strength. Well 10 is illustrated as being straight and vertical, whereas it may be angled, to reach an injection site below a building. A group of two or more test-probe wells 12 are provided for each well 10, having lower ends at points spaced from the injection site 10b of well 10. Sensors 12a are provided at the lower ends of the probe wells. Sensors 12a may be temperature-responsive elements, pressure-responsive elements, pH-sensing elements; or combinations of such sensors may be provided as may be justified.

In the illustrative apparatus of FIG. 1, there are two supplies 18 and 20 to deliver liquids to boiler 14 at feedwater pressure. One liquid supply in this example is water, and the other is a high concentration of hydrogen peroxide solution in water, as supplied commercially. Valves 16 regulate the flow of the respective supplies to the boiler.

An above-ground rudimentary form of computer 22 is provided for regulating the operation of valves 16 in response to feedback signals from sensors 12a. The computer 22 has two sections which regulate valves 16 under different criteria. One section of the computer is arranged and programmed to regulate the concentration of hydrogen peroxide that is supplied to the well for precluding high rates of reaction such as might develop hazardous (explosive) conditions. The other section of the computer is to shut off the boiler and its liquid supplies when the remediation treatment has run its course.

In operation, the hot reagent entering the subsoil at the injection site reacts with the organic pollutant, and the reagent spreads in the subsoil to react with the pollutant in the vicinity of the injection site. The reagent in this example lacks metallic salts or other catalyst prescribed by the Fenton chemistry for breaking down the hydrogen peroxide into HO radicals. Omission of the catalyst is of little concern here, inasmuch as the reagent is hot and is therefore chemically much more active than it would be at ambient temperature. Moreover, iron oxide and other substances that serve as catalysts may be expected to be present in the soil in at least trace amounts for promoting the reaction with the hot reagent.

Due to the high pressure of the injection, the reagent's initially high temperature is sustained, in some measure, as it spreads from the injection site. Moreover, heat is developed as the reagent reacts with the pollutant, the reaction being exothermic. Consequently, the initially high temperature of the reagent is sustained as the reagent is forced to spread in the subsoil. The high temperature of the reagent is thus propagated with the spreading reagent.

The chamical activity at all of the sensors 12a may diminish below norms appropriate to sustain the propagated spread of the reagent's elevated temperature. This condition would be recognized in the computer by an internal section that compares the sensed temperatures and pressures at each sensor 12a with norms that are stored. In response to such feedback from the sensors, that section of the computer is programmed to regulate valves 16 as by increasing the concentration of hydrogen peroxide supplied to the boiler: e.g. by reducing the ratio of water in relation to the hydrogen peroxide solution that is fed to the boiler and to the injection well.

Conversely, local conditions may develop that result in exothermic reaction that causes the temperature and the pressure at one or more of the sensors 12a to exceed values considered to be safe. A section of the computer may compare the pressure and temperature-representing signals from sensors 12a with internally stored values. In case of an abnormal excess developing at any of the sensors, the computer would regulate valves 16 to decrease the proportion of hydrogen peroxide relative to the water supplied to the boiler and to the injection well.

A further function is performed by the computer. If any of the sensors 12a provide signals that signify, first, a rise in reaction and then a decline in reaction, and if the declining reaction is not remedied by increasing the concentration of hydrogen peroxide supplied to the well, that performance is a sign that the concentration of pollution has been reduced below an established norm stored in the computer and used in an ongoing comparison. The treatment process has then been completed, and the supply of reagent to the boiler and operation of the boiler are automatically shut off. The stored norm represents an acceptable residual level of pollution.

Any desired number of sensors 12a may be distributed around injection well 10 at equal distances from the well. An additional group of sensors may also be provided around the well at a greater distance, as good judgment may dictate. The computer responds to that sensor (via matrix 13) which yields the highest signal from a test site where the chemical activity is greatest.

The operation of the apparatus of FIG. 1 may be arranged to respond automatically to the chemical activity occurring at sensors 12a. Steam pressure resulting from rapid chemical reaction with pollutants, and pressure from gaseous products of the reaction combine with the injection pressure that forces the reagent to spread in the subsoil. The sensed pressure temperature and pH may serve separately as measures of the intensity of the chemical activity at each sensor.

If the reaction should become hazardous, the resulting response may be used to shut down the boiler 12 and the supply lines to the boiler. Accordingly (see FIG. 1A) storage means 22a in computer 22 may be preset to represent the value of signals that develop when hazardous conditions arise, and computer 22 may incorporate means 22b for comparing the highest value from any sensor 12a with the stored value. Emergency shut-down of the apparatus results in response to an excess of any of the sensed values as compared to the stored value.

Apart from emergency shut-down of the entire operation, the sensed signals that represent chemical activity may be utilized in various ways to regulate the apparatus. For example, an excessive rate of chemical activity may be evidenced by sensed signals that are higher than an established control norm, yet lower than the hazard-representing values. Ongoing comparisons may be performed in a circuit such as that in FIG. 1A between the sensed values and a preset stored value representing the control norm. When the value from any sensor 12a exceeds the stored norm, an output signal develops for adjusting valves 16 so as to decrease the proportion of hydrogen peroxide relative to water in the reagent that is supplied to well 10.

Ordinarily, a maximum concentration of hydrogen peroxide in the reagent would be used at the start of a remediation treatment. However, if less-than-maximum concentration were tried initially, the concentration may be increased automatically in response to ongoing comparisons (as in FIG. 1A) of signals from sensors 12a with a stored value representing a desired minimum rate of activity.

Still further, signals from sensors 12a (which represent the rate of chemical activity at each sensor) may be arranged to shut down the supply of reagent to the injection well when the reaction declines to such a slow rate that further remediation treatment would be marginal, i.e., when the remediation in the range of well 10 should be considered complete. For that purpose, a circuit such as that of FIG. 1B may be incorporated in computer 22, arranged to shut down the boiler and its reagent supply. Two criteria may be used to govern the result: First, there should be a rising signal showing that some remediation occurred in the operative range of treatment of injection well 10; and subsequent to that rising signal, a declining signal should be recognized, demonstrating a waning of the chemical activity. And Second: the declining signal level should be tested until it reaches a low norm signifying that the reduction of the pollutant at every sensor in the treatment range of injection well 10 has been reduced to the target level.

Ensuing automatic shut-down of that reagent-injection apparatus can produce important economies. Where many units of the apparatus are installed for remediation of respective portions of a large polluted area, operation of many of the units continues, for cleaning up their respective portions of the whole area, but certain apparatus units are shut down when their reaction rates have decreased to the low treatment-completion level.

Figure 1A:
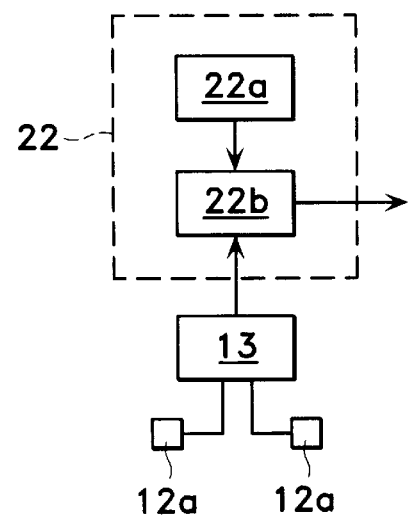
FIGS. 1A and 1B are diagrams of internal portions of FIG. 1.
Figure 1B:
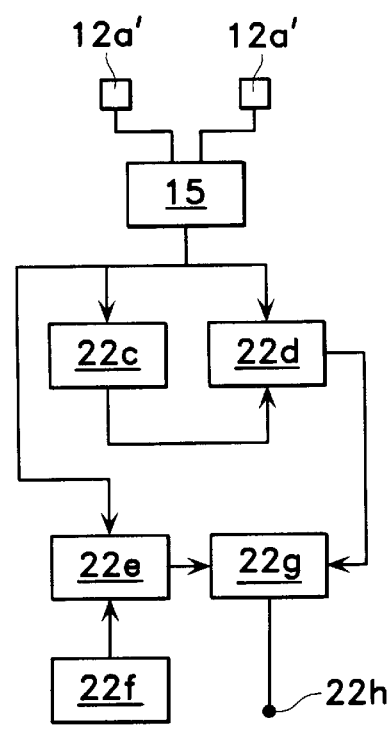

In FIG. 1B, signals from each of the sensors 12a' are accummulated in a peak storage unit 22c during an initial period of rising chemical activity. That peak value of the stored signal and the highest signal from any sensor 12a' (via matrix 15) are compared by gate 22d. The gate is arranged to be open only when the ongoing signals are lower than the stored peak signal. The ongoing signals are also compared by device 22e with a value entered in advance in storage 22f, representing the lowest level of signals from all of the sensors that signify satisfactory reduction of the pollution. When the comparison shows that the ongoing signals from all sensors 12a is less than the signal from storage device 22f, and when gate 22d is open, coincidence gate 22g opens and delivers a shut-off signal at terminal 22h for discontinuing the operation of the boiler and its supply of reagent.

The temperature of the condensate reaching the injection site of the well may drop significantly in flowing down a very deep well. Such reduced temperature of the reagent would reduce the chemical activity of the reagent as it enters the ground to be treated. For moderate depths of the injection well, the reagent's temperature would remain relatively high, particularly where (as indicated above) the wall of the injection well is well insulated. Moreover, if the reagent (under pressure) flows rapidly down the injection well and into the terrain, the reagent's temperature would not drop much. In any situation where the reagent's temperature drops excessively before reaching the injection site, it is contemplated that suitable provision may be included for sensing and boosting the temperature of the fluid that is injected into the terrain.

The apparatus of FIG. 1 represents a form of apparatus for treating a localized polluted area. More commonly, the apparatus of FIG. 1 would be effective for treating only part of a much larger polluted area. Multiple complements of the entire apparatus of FIG. 1 may be installed as a pattern of concurrently operating units to treat a large polluted area. Another strategy for treating a large polluted area is to use the apparatus of FIG. 1 to treat only a part of the polluted area, and to shift the apparatus to a succession of portions of the large polluted area.

Figure 2:
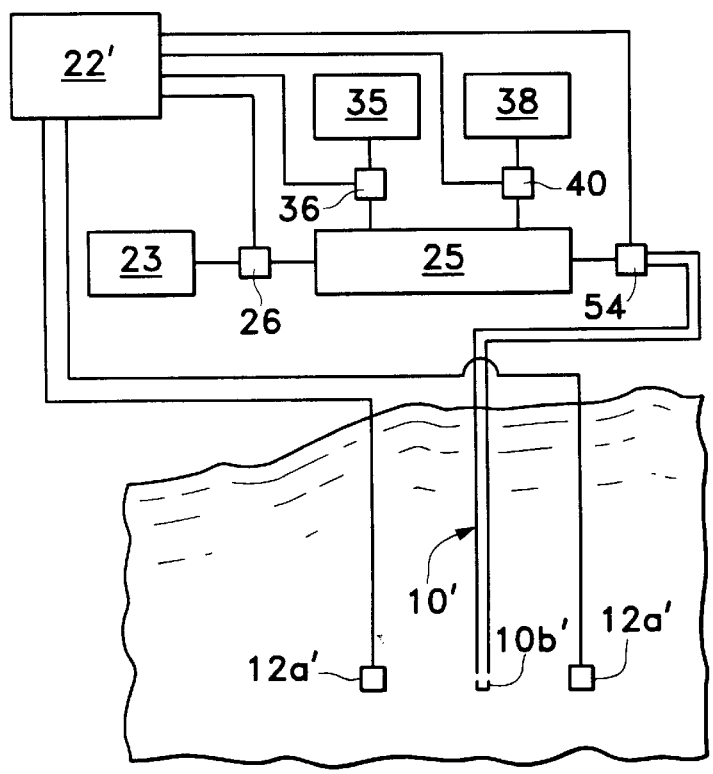
FIG. 2 is a diagram representing a second embodiment of the invention, having its own distinctive attributes.
Figure 3:
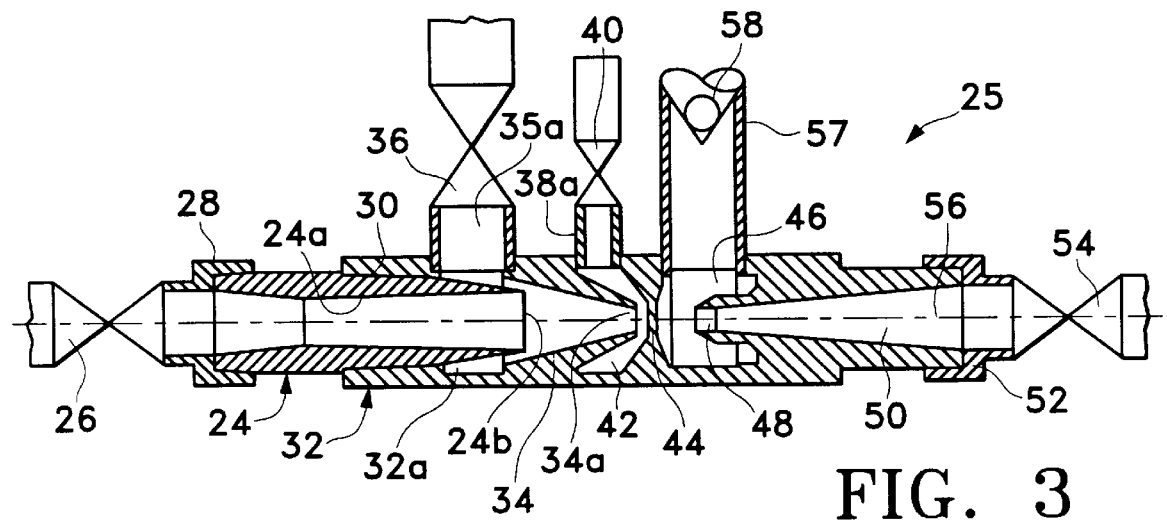
FIG. 3 is a longitudinal cross-section of a component of FIG. 2.
Figure 4:
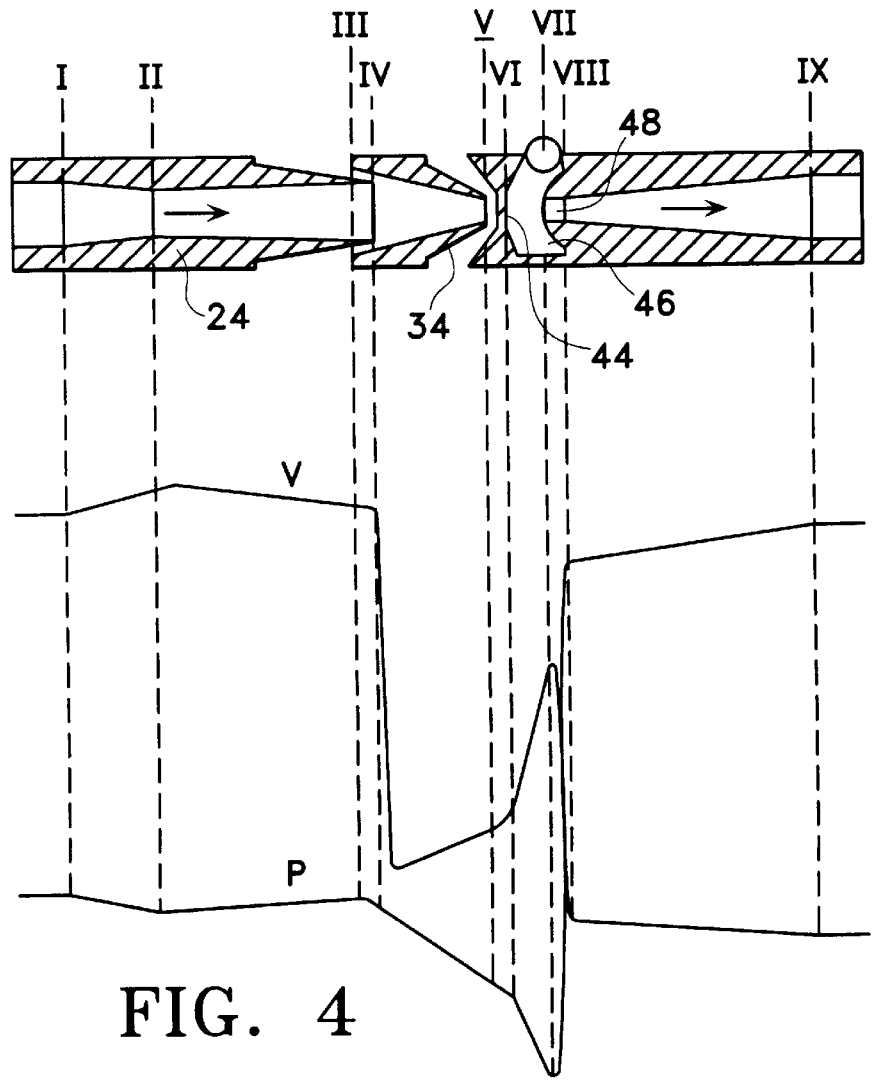
FIG. 4 is a diagrammatic representation of the component of FIG. 3, together with a diagram representing the conditions of flow along said component.

FIGS. 2–4 illustrate a second embodiment of the invention and its operation; this embodiment has its own distinctive merits. In common with the apparatus of FIG. 1, the apparatus of FIG. 2 delivers hydrogen peroxide reagent under very high pressure and at high temperature to injection site 10b' via injection well 10'. Sufficient concentractions of substances such as rust are inevitably contained in the sub-soil to act as a catalyst, particularly at the high temperatures of the reagent, to promote the desired reaction of the reagent with pollutant at the injection site. Because the reaction is exothermic, the high temperature of the reagent entering the sub-soil is sustained as the reagent spreads under pressure. The process is self-propagating as the reagent spreads, so long as there are sufficient concentrations of the reagent and the pollutants.

Primed numerals in FIG. 2 designate parts that correspond to like-numbered parts in FIG. 1. Where the description of FIG. 1 is applicable to FIG. 2, that description may amplify the following discussion of FIG. 2. Some of the numerals in FIG. 2 designate parts in FIG. 3, described below.

In FIG. 2, a source 23 such as a boiler provides steam under pressure to an inlet end of device 25 via valve 26. A source 35 of hydrogen peroxide in water, and a source 38 of water deliver those liquids to device 25 via slide valves 36 and 40, respectively. Source 35 contains a concentrated, commercially available solution of hydrogen peroxide in water, for example a 75% solution of hydrogen peroxide in water. A slide valve 54 regulates the output flow of device 25.

Computer 22' regulates the concentration of hydrogen peroxide in the reagent delivered by device 25. For that purpose, computer-controlled valves 36 and 40 regulate the supplies of hydrogen peroxide solution and of water to device 25, and the computer also controls slide valve 26 to regulate the flow of steam to device 25.

As an alternative, device 25 may be simplified so as to have only one liquid input instead of the two that are represented in FIGS. 2–4. In that case, the flow from valves 36 and 40 could be combined to provide a single supply of liquid reagent to device 25, having a concentration of hydrogen peroxide regulated by the computer.

Both in the embodiment of FIG. 2 and the just-described alternative, the ultimate concentration of hydrogen peroxide in the reagent delivered by device 25 to the injection well should take into account the amount of water in the steam supplied to device 25.

The computer of FIG. 2 includes apparatus corresponding to that of FIGS. 1A and 1B. As in FIGS. 1A and 1B, the embodiment of FIG. 2 includes sensors 12a' which control computer 22'. Sensors 12a' (only two being shown) are distributed in concentric groups at various distances from injection site 10b'.

Device 25 (FIG. 2), shown in detail in FIG. 3, is that apparatus which is shown and described in U.S. Pat. Nos. 5,205,548 and 5,275,486, issued to Vladimir V. Fissenko on Apr. 27, 1993 and on Jan. 4, 1994. The entire content of those patents is incorporated here by reference. The following is a digest of those patents, for amplifying the disclosure of the invention illustrated in FIG. 2.

Device 25 in FIGS. 2 and 3 represents the device shown in FIG. 2 of Fissenko U.S. Pat. No. 5,205,648. Device 25 includes an elongated feed line 24 having a longitudinal passage 24a for steam supplied by source 23 via inlet valve 26. Threaded coupling 28 joins valve 26 to the inlet end of feed line 24. The diameter of inner passage 24a of feed line 24 at first decreases along its length to a minimum, then increases to a maximum at its outlet end 24b. The outlet end 24b of feed line 24 is conical externally and internally.

Feed line 24 is joined by threaded coupling 30 to the inlet end of body 32. A nozzle 34 is an integral part of body 32. The outlet end of feed line 24 enters the wide inlet end of nozzle 34. A conical outer surface of feed line 24 at its outlet end and a cylindrical inner surface of body 32 define an annular passage 32a that opens into the wide inlet end of nozzle 34. Liquid enters annular passage 32a from radial inlet 35a; this liquid is provided via slide valve 36, from source 35. Liquid leaving annular passage 32a merges with the steam flowing along feed line 24.

The exterior of nozzle 34 and body 32 form an annular passage 42 for water to enter body 32 via radial inlet 38a and slide valve 40. Fluid leaving the discharge end of nozzle 34 merges with fluid from annular passage 42. All of the combined fluids pass through aperture 44, and enter expansion chamber 46. A short cylindrical outlet channel 48 guides fluid from expansion chamber 46 into conically tapering diffuser passage 50. The diameter of diffuser passage 50 increases progressively from channel 48 to its outlet end. Coupling 52 joins body 32 to output-regulating slide valve 54.

The diameter of channel 48 is uniform along its length. That diameter should be between the diameter of aperture 44 and three times the diameter of aperture 44.

Feed line 24 and body 32 have a common axis 56; fluid flows along a straight path from the steam inlet end to the exit coupling 52. Components 24 and 32 and their described portions are rotationally symmetrical around longitudinal axis 56.

Expansion chamber 46 has a radial passage 57 to pressure relief valve 58. For a full discussion of the relief valve, and operation of the entire apparatus during start-up conditions, see the Fissenko patents.

FIG. 4 here (also FIG. 4 in the Fissenko patents) represents the variations in velocity V and pressure P along the flow axis 56 during sustained operation of the apparatus. There is a small increase in flow velocity and a small decrease in pressure P along flow passage 24a, between its large diameter entry end (section I) and its smallest-diameter portion (section II).

The cross-section of passage 24a increases somewhat between section II and III; between sections II and III, the flow velocity V decreases somewhat and the pressure P increases somewhat. At section IV, where liquid from annular passage 32a merges with steam entering the wide inlet end of nozzle 34, there is a steep drop in flow velocity V. Between sections IV and V (in and along nozzle 34) the flow velocity increases and the pressure drops.

Liquid from annular passage 42 merges with the longitudinal flow between sections V and VI; and the combined flow passes through aperture 44 and enters expansion chamber 46. In chamber 46 between aperture 44 and exit channel 48, the velocity increases and the pressure drops.

There is an enormous increase in pressure and a concurrent drop in velocity of the fluid entering channel 48. The explanation of this phenomenon is that a sustained shock front or shock wave develops where the two-phase fluid passing through aperture 44 encounters the fluid in passage 48. The fluid passing through aperture 44 is a two-phase fluid comprising steam and liquid. As a result of the proportions of the apparatus and the various flow velocities, the flow through aperture 44 is at or above supersonic velocity, increasing still further in chamber 46. A shock wave forms in channel 48. The pressure downstream of the shock wave-front is vastly greater than the pressure that prevails upstream in the expansion chamber 46. That is because the pressure increase is proportional to the square of the Mach number.

The Mach number is the flow velocity divided by the velocity of sound in the fluid. The velocity of sound in the two-phase fluid of steam and water is 5 meters per second. For a flow velocity of, for example, 30 meters per second approaching the shock-front, the downstream pressure would be 36 times the upstream pressure, i.e., a factor of $(30/5)^2=6^2=36$. With higher flow velocities, the pressure multiple may be 100 or even 1,000. The flow delivery pressure is far greater than the pressures of supply 23 of steam and of the supplies 35 and 38 of liquid.

The velocity of the flow in or entering channel 48 decreases precipitously. In its high pressure region, the fluid leaving channel 48 is liquid. Its temperature is high; it may be 90° C. or it may be higher. Some of the thermal energy originally in the steam is converted to mechanical energy in developing the high pressure.

The fluid connection between device 25 and injection well 10' should be designed to sustain the high pressure and temperature of the fluid leaving device 25.

The high pressure of the delivered fluid reagent is sustained by the operation of the device itself, essentially without regard to the resistance encountered by the delivered flow. This trait renders the apparatus of FIG. 2 particularly effective for injecting remediation reagent into varied strata. In practice, the injected reagent might encounter near-impenetrable clay or an essentially porous stratum.

As discussed above, the high temperature of the reagent that spreads under pressure from the rejection site 10b' is sustained as it spreads. The hot reagent, tending to cool as it spreads, is heated by the exothermic reaction of the pollutants encountered by the spreading reagent. Understandably, that high temperature of the reagent is not propagated indefinitely with the spread of the reagent. The temperature of the reagent may be expected to drop as the concentration of the spreading reagent diminishes. The injection wells of additional units of the apparatus should be installed at the limits of their effective ranges, each in relation to the others.

The two embodiments of the invention, FIG. 1 and FIG. 2, are both highly effective for delivering aqueous hydrogen peroxide reagent under pressure and at an elevated temperature to remediation wells. The reagent delivered by the apparatus of FIG. 2 would ordinarily be liquid; and while the reagent delivered to the injection well by the apparatus of FIG. 1 may be flash steam, it would condense due to the prevailing pressure and the chilling effects along the well and upon entering the terrain.

A wide range of temperatures and pressures of the reagent may be found desirable in practice. For example, a reagent temperature of 90° C. and pressure of 50 p.s.i. are reasonable. Higher values of pressure are advantageous where the subsoil is largely of clay. The elevated temperature of the reagent promotes rapid reaction of the hydrogen peroxide with organic pollutants where no provision is added for introducing a catalyst.

Variations and substitutions may be introduced by those skilled in the art in the apparatus and method described above, and represented in the accompanying drawing. Consequently, the invention should be construed broadly in accordance with its true spirit and scope.

What is claimed is:

1. Apparatus for in situ remediation of underground organic pollution, including an injection well extending to a subterranean injection site, means for supplying a reagent of hydrogen peroxide in water to the top of the well at a pressure substantially above ambient, for in situ reaction with organic pollutant, said reagent-supplying means including means for heating the reagent to a temperature substantially above ambient.

2. Apparatus as in claim 1, wherein said reagent-supplying means comprises a boiler and means for supplying fluid to said boiler, said means for supplying fluid including means providing a supply of aqueous hydrogen peroxide solution and a supply of water, the boiler, when in operation, providing said reagent at a temperature substantially above ambient and at a pressure substantially above ambient.

3. Apparatus as in claim 1, wherein said reagent-supplying means includes a boiler for supplying steam at a pressure substantially above ambient and means for providing an aqueous solution of hydrogen peroxide, and a device for combining said steam and said aqueous solution to yield a flow of a two-phase fluid, said device having means for accelerating the flow of said two-phase fluid at least to its supersonic velocity and having means for developing a shock front in the flow of the two-phase fluid so as to result in pressure of the fluid downstream of the shock front greatly exceeding the ambient pressure.

4. Apparatus as in claim 1, further including means for monitoring the conditions of the in situ reaction, and means responsive to the monitoring means for regulating the reagent supplied to the well.

5. Apparatus as in claim 1, including means for sensing the effects of chemical reaction of the reagent with pollutant in situ, means for detecting an increase in reaction effects followed by a decrease in the reaction effects, means for detecting a low level of reaction effects at which the remediation may be considered complete, and means responsive to both said detecting means for shutting off further operation of said remediation apparatus.

6. A method of in situ remediation of underground organic pollution, including the step of heating a reagent of hydrogen peroxide in water to a temperature substantially above ambient, and supplying a flow of the heated reagent under pressure substantially above ambient to a well having a subterranean injection site for injection of the reagent into the subsoil and reaction with organic pollutant in situ.

7. A method as in claim 6, wherein the step of heating said reagent comprises converting the reagent to steam at a temperature substantially above ambient and at a pressure substantially above ambient.

8. A method as in claim 6, including the step of combining an aqueous solution of hydrogen peroxide with steam to provide a combined flow of said solution and steam and accelerating said combined flow at least to its supersonic velocity, including the further step of causing the accelerated flow to develop a shock front wherein the pressure of the fluid downstream of the shock front greatly exceeds the ambient pressure, said downstream flow being supplied to the well.

9. A method as in claim 6, including the further step of sensing the conditions of the in situ reaction, and regulating the supply of hydrogen peroxide to the well in dependence on the sensed conditions.

10. A method as in claim 6, including the further step of detecting increasing intensity of the chemical reaction to a peak and subsequent decline from the peak, and detecting attainment of a low level of reaction representing completion of the remediation, and discontinuing the remediation treatment after detection of said increase and decline of the reaction intensity upon subsequent detection of the reaction attaining said low level.

11. A method of remediating soil containing organic pollutant, including the steps of injecting said remediation fluid into a subterranean treatment site, monitoring the chemical reaction between the injected fluid and the pollutant, and controlling the injection of the remediation fluid in dependence on the result of the monitoring step, and said remediation fluid is steam and aqueous hydrogen peroxide combined, and said monitoring step is performed by regulating the concentration of the hydrogen peroxide in said remediation fluid.

12. A method as in claim 11, wherein said monitoring step includes storing a value that represents an effect of the chemical reaction when the pollution has been reduced to a low level considered acceptable and making comparisons of the values of that effect of ongoing chemical reactions with said stored value, and wherein said control of the injection of remediation fluid is performed by terminating the injection of such fluid.

* * * * *